(12) United States Patent
Chandrasekaran

(10) Patent No.: US 6,948,044 B1
(45) Date of Patent: Sep. 20, 2005

(54) METHODS AND APPARATUS FOR STORAGE VIRTUALIZATION

(75) Inventor: Varagur V. Chandrasekaran, Fremont, CA (US)

(73) Assignee: Cisco Systems, Inc., San Jose, CA (US)

(*) Notice: Subject to any disclaimer, the term of this patent is extended or adjusted under 35 U.S.C. 154(b) by 286 days.

(21) Appl. No.: 10/209,786

(22) Filed: Jul. 30, 2002

(51) Int. Cl.[7] .............................................. G06F 12/10
(52) U.S. Cl. .............................. 711/203; 711/5; 711/6; 711/111; 711/202; 709/201; 709/202; 709/203; 709/220; 709/223; 709/224; 709/230; 709/246; 370/252; 370/389; 370/392; 370/400; 370/410; 370/466; 370/470
(58) Field of Search ........................ 711/5, 6, 111, 202, 711/203; 709/220, 223, 224, 230, 246, 201, 709/202, 203; 370/252, 389, 392, 400, 410, 370/466, 470

(56) References Cited

U.S. PATENT DOCUMENTS

2002/0156987 A1 * 10/2002 Gajjar et al. ................. 711/203
2003/0093567 A1 * 5/2003 Lolayekar et al. .......... 709/246
2003/0172149 A1 * 9/2003 Edsall et al. ................. 709/224

OTHER PUBLICATIONS

Server World, "*SAN Virtualization: Just Make Sure It Works*", http://www.serverworldmagazine.com/opinionw/2001/05/10_virtu-ual, OpinionWire May 10, 2001 ©, Butler Direct Limited.
InterOperability Lab Fiber Channel Tutorials and Resources, pp. 1-22, http://www.iolunh.edu/training/fc/fc_tutorial.html, Last updated: May 4, 1998.

* cited by examiner

Primary Examiner—Donald Sparks
Assistant Examiner—Bao Quoc Truong
(74) Attorney, Agent, or Firm—Beyer Weaver & Thomas, LLP

(57) ABSTRACT

Methods and apparatus are provided improving data access efficiency in a storage area network. Mechanisms are provided to allow a virtual disk address to be efficiently mapped to a particular physical partition in a virtual disk while recognizing the mirroring, striping, and concatenation characteristics associated with the virtual disk. A variety of indices are used to allow direct access of a physical partition upon identification of a virtual disk address.

33 Claims, 10 Drawing Sheets

METHODS AND APPARATUS FOR STORAGE VIRTUALIZATION

BACKGROUND OF THE INVENTION

1. Field of the Invention

The present invention relates to storage area networks. More specifically, the present invention relates to methods and apparatus for efficiently accessing data in a storage area network.

2. Description of Related Art

In a storage area network such as a fibre channel network, data associated with a variety of hosts connected to the storage area network is maintained on a variety of persistent storage devices such as disks that are located throughout the network. A host may or may not be aware of the variety of persistent storage devices in the network. By using a variety of persistent storage devices, features such as mirroring, striping, and concatenation can be implemented. To allow access to the variety of persistent storage devices while still maintaining relative interface simplicity in a host, layers of abstraction and virtualization are used to allow a host to read and write data to a single entity. A fibre channel switch then translates and maps read and write access to the single entity to a variety of persistent storage devices in the fibre channel network to allow implementation of features such as mirroring, striping, and concatenation. However, accessing persistent storage devices through the layers of virtualization has been inefficient.

It is therefore desirable to provide methods and apparatus for improving data access in fibre channel networks using layer of virtualization.

SUMMARY OF THE INVENTION

Methods and apparatus are provided improving data access efficiency in a storage area network. Mechanisms are provided to allow a virtual disk address to be efficiently mapped to a particular physical partition in a virtual disk while recognizing the mirroring, striping, and concatenation characteristics associated with the virtual disk. A variety of indices are used to allow direct access of a physical partition upon identification of a virtual disk address.

In one embodiment, a method for accessing data is provided. The method includes receiving a disk access request at a fibre channel switch from a host. The disk access request identifies a transfer length and a virtual disk address in a virtual disk address space associated with the host. An entry in an index is identified. The entry corresponds to the virtual disk address in the virtual disk address space. The entry provides access to a physical partition.

In another embodiment, a fibre channel switch is provided. The fibre channel switch includes an interface and a processor. The interface is configured to receive a disk access request at a fibre channel switch from a host. The disk access request identifies a transfer length and a virtual disk address in a virtual disk address space associated with the host. The processor is coupled to the interface. The processor is configured to identify an entry in an index. The entry corresponds to the virtual disk address in the virtual disk address space. The entry provides access to a physical partition.

In another embodiment, a method for accessing data is provided. The method includes receiving a persistent storage access request at a fibre channel switch from a host. The persistent storage access request identifies a transfer length and a virtual address in a virtual persistent storage address space associated with the host. An entry in a physical partition index is identified. The physical partition index is associated with a plurality of physical partitions. The entry corresponds to the virtual address in the virtual persistent storage address space. The entry references a target physical partition having a first size.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

The present invention relates to accessing data in a network. More specifically, the present invention relates to methods and apparatus for improving access to persistent storage in a fibre channel network.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fibre channel used in a storage area network. However, it should be noted that the techniques of the present invention are applicable to a variety of different protocols and networks. Further, the solutions afforded by the invention are equally applicable to non-fibre channel networks. In one example, the techniques can apply to networks that generally do not allow packet dropping. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
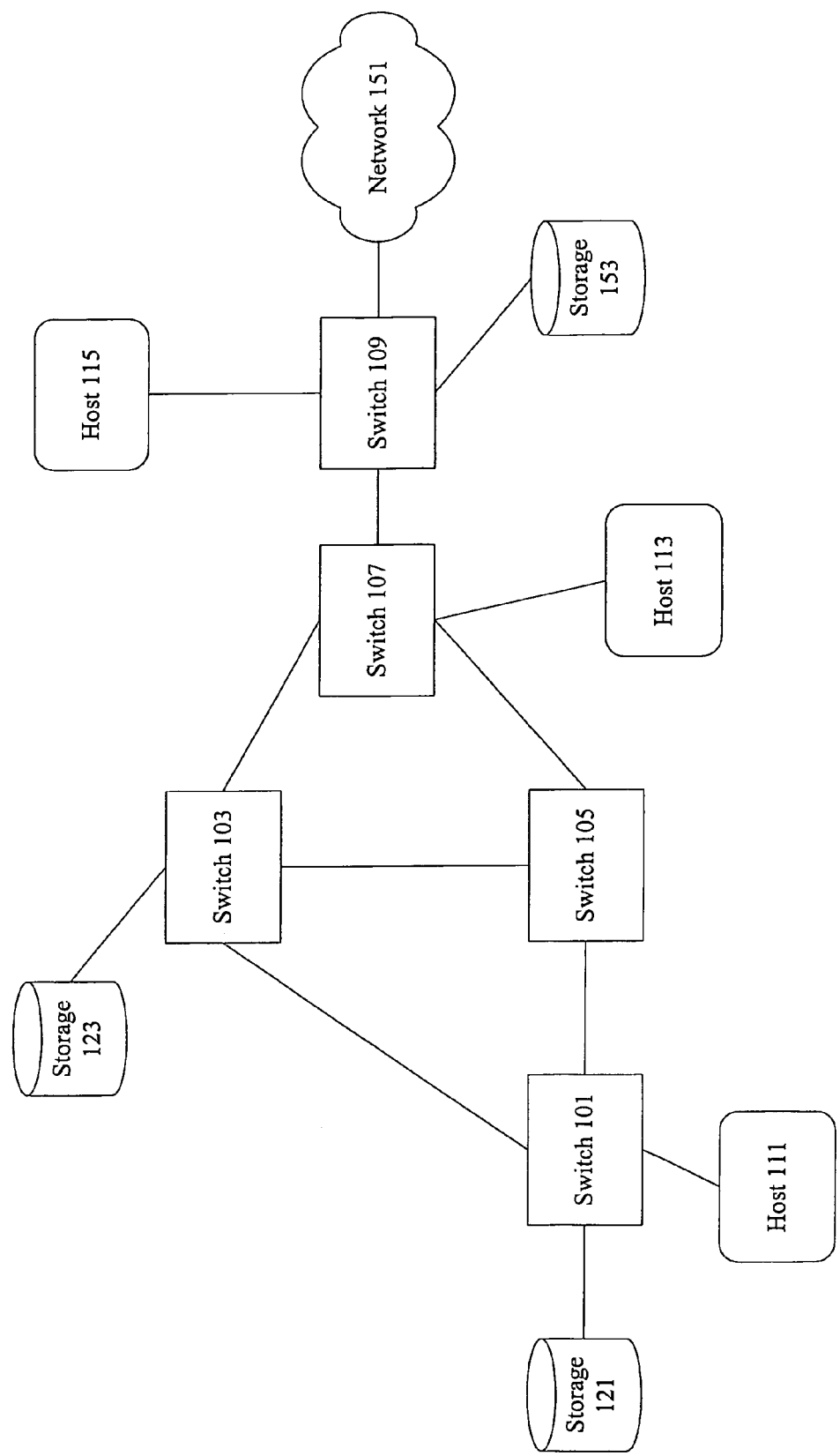
FIG. 1 is a diagrammatic representation of a network that can use the techniques of the present invention.

FIG. 1 is a diagrammatic representation of one example of a storage area network that can use the techniques of the present invention. A switch 101 is coupled to switches 103 and 105 as well as to a host 111 and storage 121. In one embodiment, host 111 is a server or client system while storage 121 is single disk or multiple disks. Interconnected switches 103 and 105 are both coupled to switch 107. Switch 107 is connected to host 113 and switch 103 is connected to storage 123. Switch 109 is connected to host 115, switch 107, storage 153, and an external network 151 that may or may not use fibre channel.

According to various embodiments, a host 111 performs various operations with storage devices 121, 123, and 153. Typical operations for a host 111 include reading and writing information to storage devices 121, 123, and 153. However, other operations such as format and test are also contemplated. In typical implementations of fibre channel, a host 111 does not simply provide read or write information to a single storage device. Instead, techniques such as virtualization and mapping are used to spread the data across multiple storage devices. The distribution of data across multiple storage devices provides not only data integrity and redundancy, but also provides data access efficiency. In one example, storage of a first portion of data is placed in storage device 121 while the second portion of data is placed in storage device 123.

Instead of waiting for all of the data from a single storage device, a host 111 can access storage devices 121 and 123 simultaneously to more efficiently gather both the first and second portions of the data. Data is striped across multiple storage devices. Spreading the data across multiple storage devices is referred to herein as striping. A storage area network also provides redundancy. In one example, data stored in device 123 is mirrored on storage device 153. Maintaining data redundantly in multiple storage devices is referred to herein as mirroring. In one example, mirroring is accomplished by storing data in two different disks both connected to a switch 101.

Using a storage area network with multiple storage devices also provides a host the ability to store larger blocks of data. In one example, storage device 123 may have a 1 GB partition available. Storage device 153 may have a 500 MB partition available. If a host 111 has a 1.5 GB block of data, the host 111 can write the 1.5 GB block of data to the storage area network where switches 101, 103, 105, 107, and 109 are capable of transparently writing a portion of that 1.5 GB block of data to storage device 123 and writing the other portion of the 1.5 GB block of data to storage device 153. Combining multiple physical partitions to form a larger virtual disk is referred to herein as concatenation. A storage area network is capable of providing features such as mirroring, striping, and concatenation for a host 111 that may not even be aware that the data block is being written to multiple storage devices. In typical implementations, the host is only aware that it is communicating with a volume or some other virtual representation of a storage device. According to various embodiments, fibre channel switches such as switch 101 transparently map disk access by the host onto one or more virtual disks. In one embodiment, the virtual access by the host is represented as a virtual logical unit read or write at a logical block address (LBA) combined with a virtual logical unit transfer length. Features such as mirroring, striping, and concatenation are described in the "Raid Advisory Board Guide To Non-Stop Data Access", by Joe Molina, available from the Raid Advisory Board, the entirety of which is incorporated by reference for all purposes.

Figure 2:
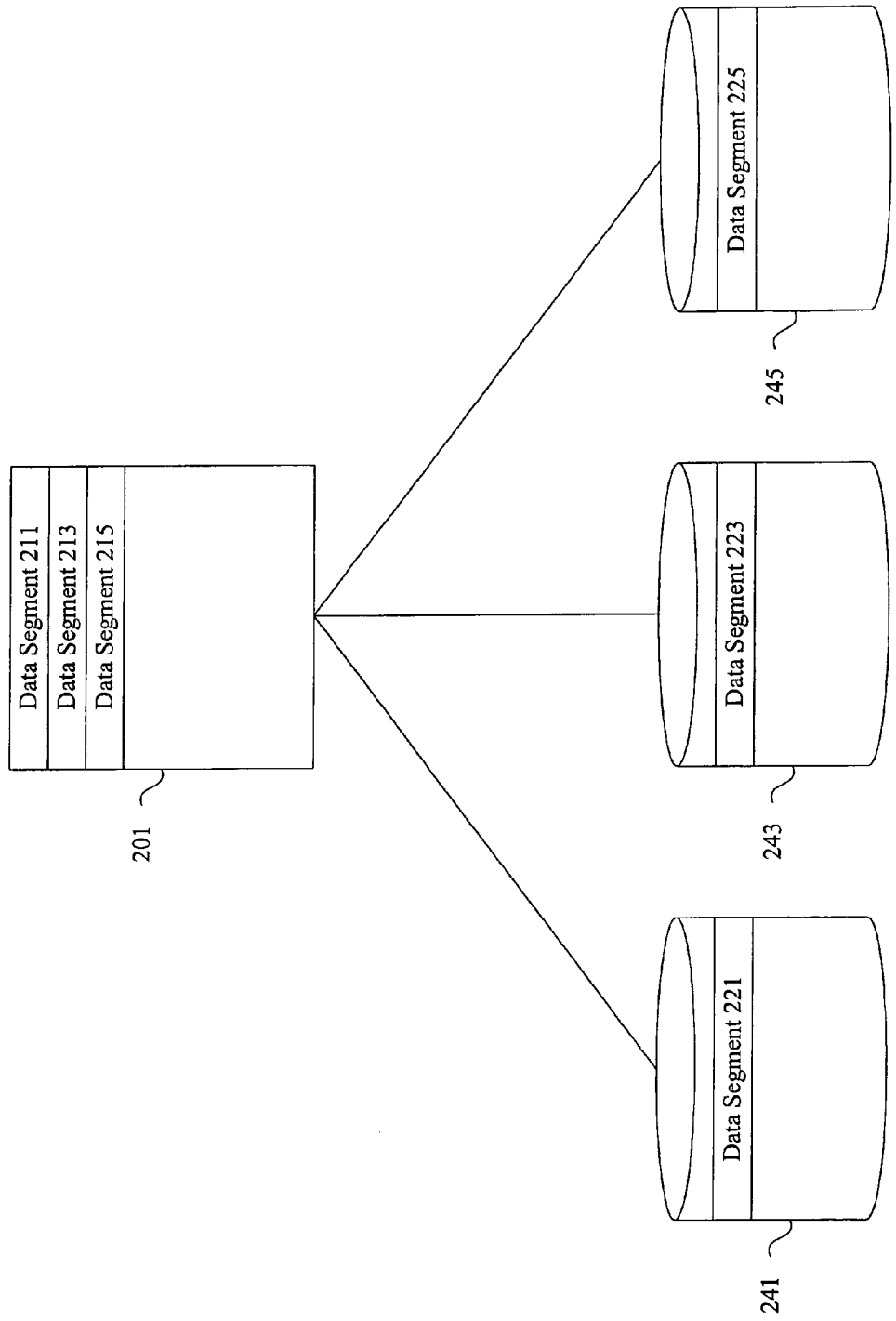
FIG. 2 is a diagrammatic representation showing striping across multiple disks.

FIG. 2 shows one example of striping across multiple virtual disks. According to various embodiments, a switch writes data segments 211, 213, and 215 in a virtual disk address space 201 to a storage device. Any virtual representation of a storage device with addresses that are mapped to particular physical partition addresses is referred to herein as a virtual disk address space. A particular address in the virtual disk address space is referred to herein as a virtual disk address. It should be noted that the virtual disk address space 201 may be maintained in one or more fibre channel switches and each virtual disk address space 201 is typically associated with a particular host or a particular user accessing the host. In typical implementations, a host reads and writes data into this virtual disk address space without knowing where the data is ultimately stored. In one example, the data segments 211, 213, and 215 are striped across multiple virtual disks 241, 243, and 245. According to other embodiments, each virtual disk includes multiple physical partitions. That is, each virtual disk includes physical partitions of storage devices that are be spread throughout a storage area network. Some of these physical partitions may not be directly connected to the same fibre channel switch.

Striping is typically used to improve data access efficiency. During a read access, multiple virtual disks and typically multiple different physical partitions are accessed for data segments 221, 223, and 225. Instead of accessing a single physical partition, multiple physical partitions may be accessed simultaneously to more efficiently gather the data block. During a right access, data segments 211, 213, and 215 are written substantially simultaneously to different virtual disks and consequently, in typical cases, different physical partitions. Having different physical partitions receive data simultaneously is typically more efficient than writing the entire block of data to a single physical partition.

Figure 3:
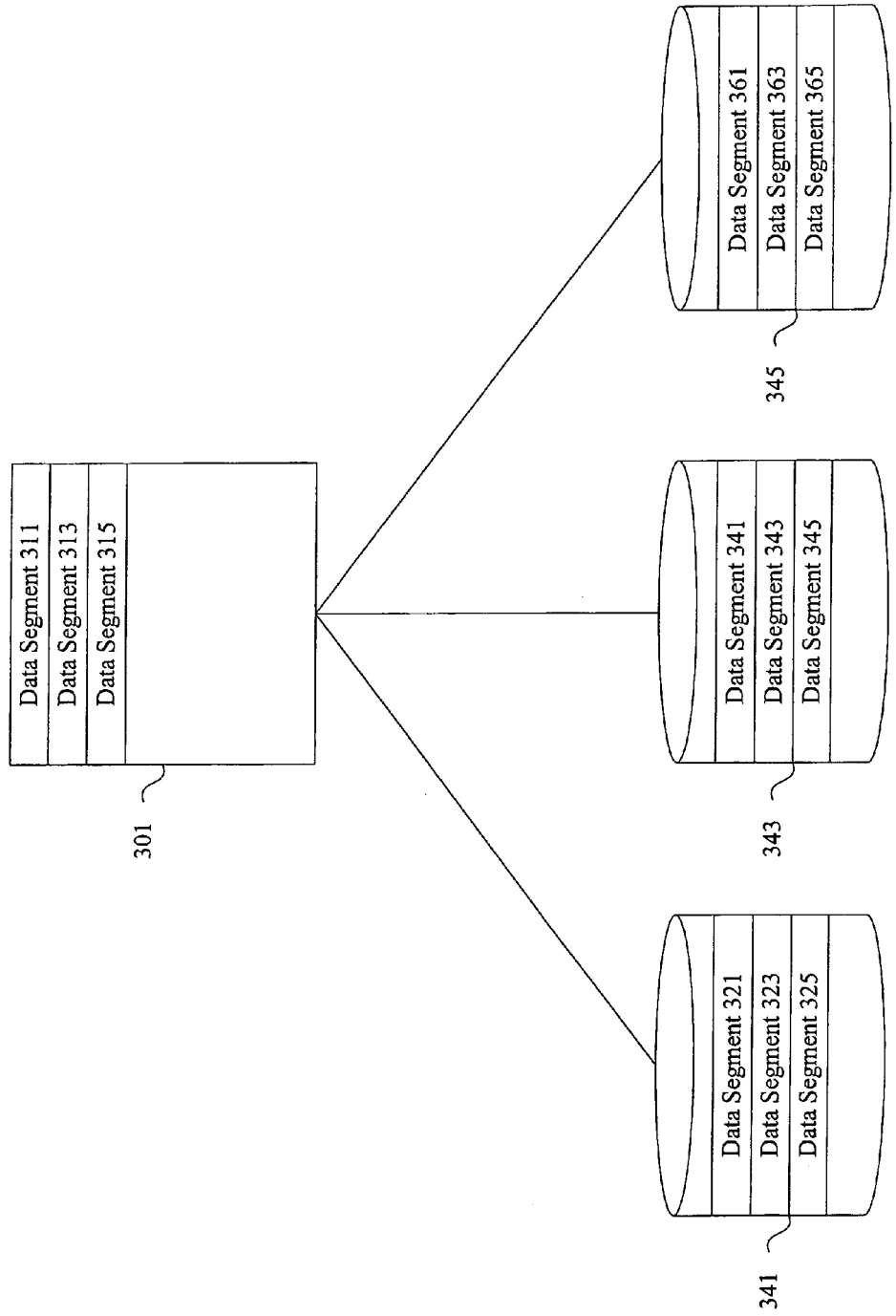
FIG. 3 is a diagrammatic representation showing mirroring across multiple disks.

FIG. 3 is a diagrammatic representation showing mirroring across multiple virtual disks. A host issuing a read access request for data segments 311, 313, and 315 in a virtual disk address space is actually accessing data segments 321, 323, and 325 in a virtual disk 341. A virtual disk 341 may include multiple physical partitions in separate physical disks. According to various embodiments, a fibre channel switch automatically mirrors the data onto virtual disks 343 and 345. If a virtual disk 341 has physical partitions that become corrupted, a fibre channel switch can retrieve the data from a different virtual disk 343.

It should be noted, that in many implementations both striping and mirroring are used. In one example, data is striped to the second virtual disk and mirrored to a third and fourth virtual disk.

Virtual disks are configurable both manually and automatically and are usually implemented to optimize redundancy and efficiency. In one example, the first 1 GB partitions in multiple virtual disks are not mapped to physical partitions from the same physical disk. If the physical disk is corrupted and all of the physical partitions are corrupted, data can not be recovered since the multiple virtual disks all had data mirrored onto the same physical disk. Data access would similarly be deficient in the scheme. Although data would be striped across three virtual disks, the data would in reality be written to the same physical disk because the three different physical partitions in the multiple virtual disks all reside on the same physical disk.

Figure 4:
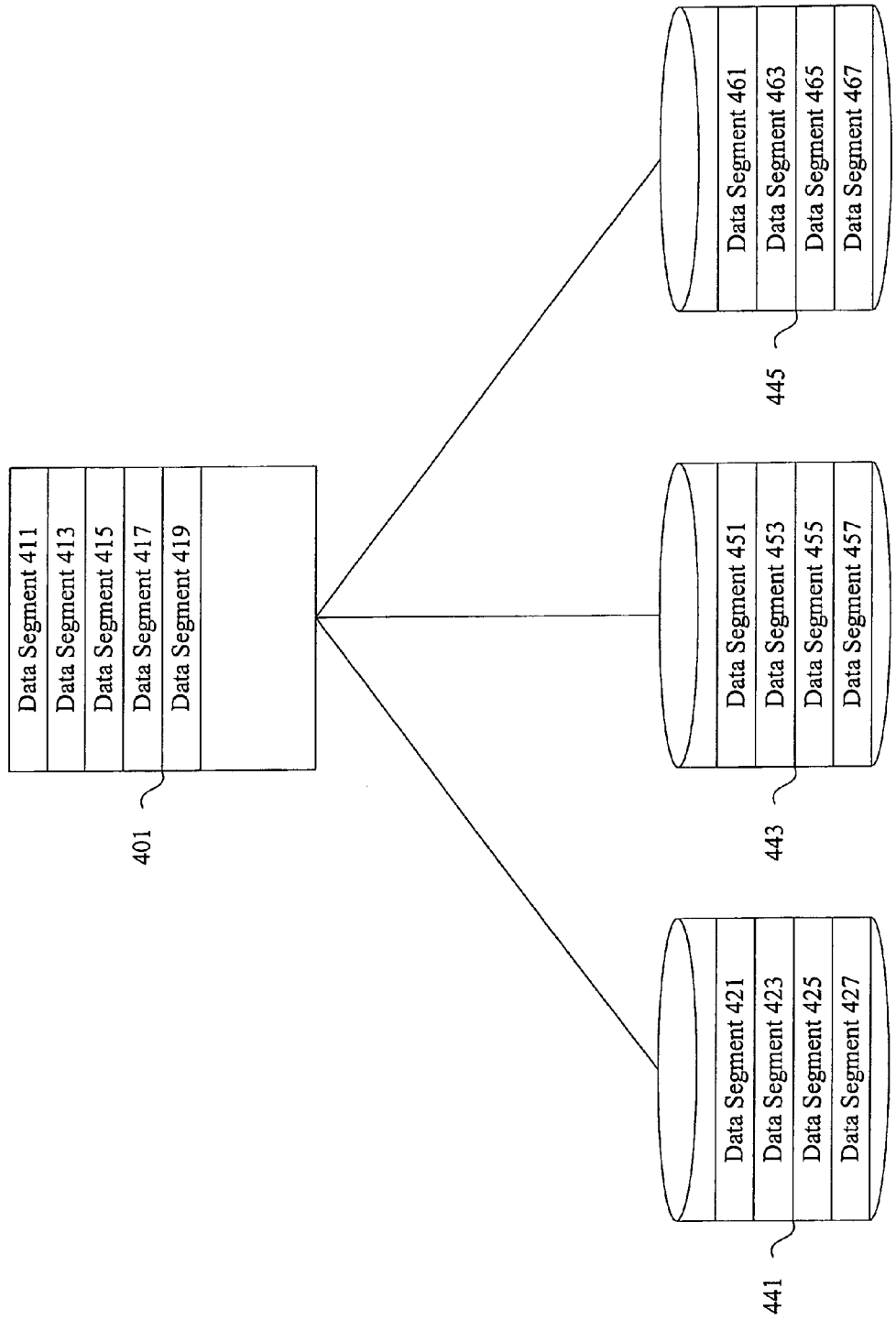
FIG. 4 is a diagrammatic representation showing concatenation across multiple disks.

FIG. 4 is a diagrammatic representation showing concatenation. A host may have a block of data to write that does not fit in a particular physical partition. A fibre channel switch in a storage area network typically provides a virtualization technique to allow multiple physical partitions to be concatenated to form a single virtual disk. In one example, the data segment 427 is written into a partition in a first physical disk as well as a partition in a second physical disk. In typical implementations, a fibre channel switch maintains a linked list to track the physical partitions. The linked list is used to determine which physical partition to provide for reading or writing data.

According to various embodiments, if a data segment is to be written into a virtual disk, the different physical partitions in the linked list are stepped through to determine in which physical partition the data should be written. However, stepping through the nodes in the linked list is inefficient. According to various embodiments, the techniques of the present invention provides mechanisms for more efficiently accessing physical partitions and physical partition target addresses. The address in a physical partition in which a read or write operation is to take place is referred to herein as a physical partition target addresses. The first address that in a physical partition is referred to herein as a physical partition start address. The last address in a physical partition is referred to herein as the physical partition address.

Figure 5:
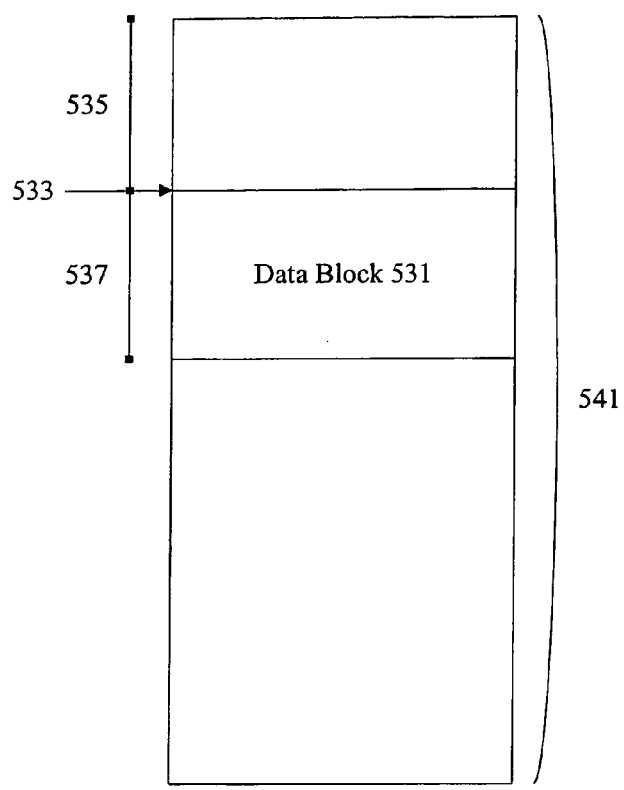
FIG. 5 is a diagrammatic representation showing a virtual logical unit associated with a virtual disk associated with physical disk partitions.
Figure 5:
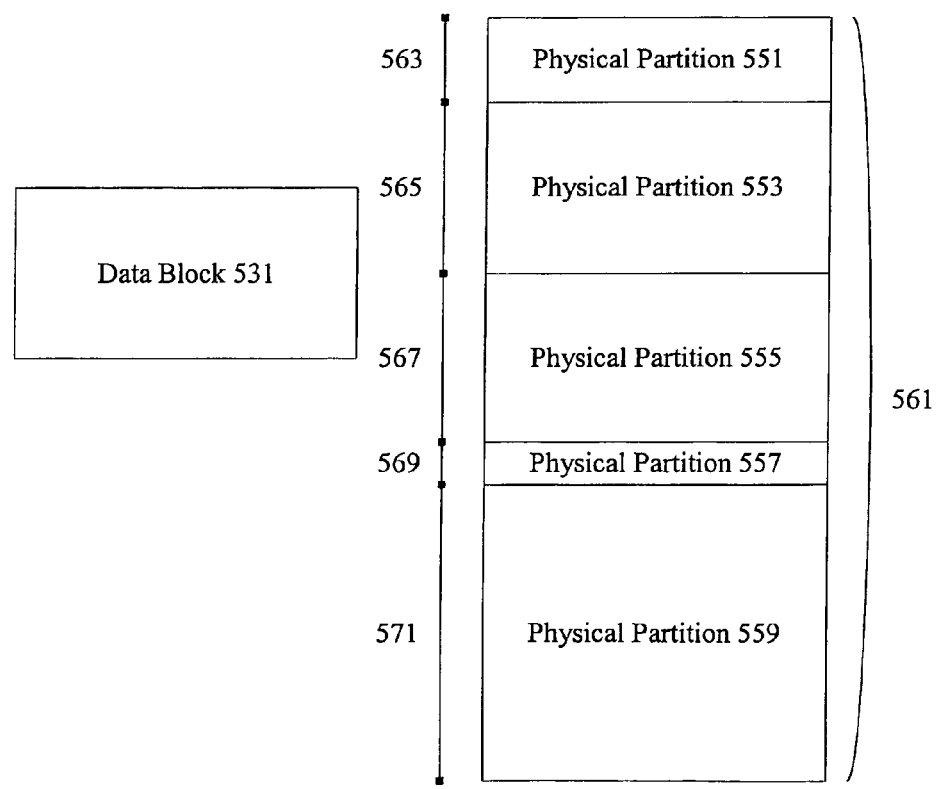

FIG. 5 is a diagrammatic representation showing a virtual address space and a corresponding virtual disk. It should be noted that each virtual address space may be mapped to multiple virtual disks for purposes such as mirroring and striping. In one embodiment, mirroring, striping, and concatenation are all used. According to various embodiments, virtual disk address space 541 corresponds in size to the virtual disk 561. The virtual disk 561 includes physical partitions 551, 553, 555, 557, and 559. The physical partitions have lengths of two GB, 4 GB, 4 GB, 1 GB, and 6 GB represented as 563, 565, 567, 569, and 571. In one example, a host writes a data block 531 to a virtual address 533 in virtual address space 541. The offset 535 from the start of the virtual address space is 4 GB. The length of data block 531 is also 4 GB. In some examples, the virtual address 533 is referred to as the virtual logical unit logical block address and the length of the data block 531 is referred to as the transfer length.

To determine where data block 531 would be written, characteristics of the physical partition 551 would be examined to determine the size and offset. In one example, it would be determined that the physical partition 551 is 2 GB in length and has an offset of zero from the start of the virtual disk. Virtual disk address 533 having an address of 4 GB would not fall in physical partition 551. Using the linked list, the next physical partition 553 would be examined. A pointer typically is used to point to the next physical partition 553. Physical partition 553 would be examined to determine the characteristics of the physical partition 553. According to various embodiments, an entry corresponding to physical partition 553 and not the physical partition itself is examined. In one embodiments, the entry is a node in a link list. The entry includes information about the size of the physical partition, the offset from the start of the virtual disk, and the actual location of the physical partition and the actual start address in the physical disk. Physical partition 553 has a length of 4 GB and an offset of 2 GB from the start address of the virtual disk. The actual location of the physical partition is a predetermined location on the fibre channel network and the actual start address in the physical disk is a predetermined address on the physical disk.

According to various embodiments, a virtual disk address of 533 with an offset of 4 GB would fall in physical partition 553. The data block 531 would then be written into physical partition 553 until the end the physical partition 553 is reached. Upon recognizing that a portion of the data block 531 can not be written into physical partition 553, the linked list would be used to access the next physical partition 555. Physical partition 555 would then be written until the end of the data block 531 is reached. By using concatenation, a data block 531 can be written even though a physical partition 553 does not have sufficient space. The data block 531 written at a virtual disk address 533 would be written partially in physical partition 553 and partially in physical partition 555.

Figure 6:
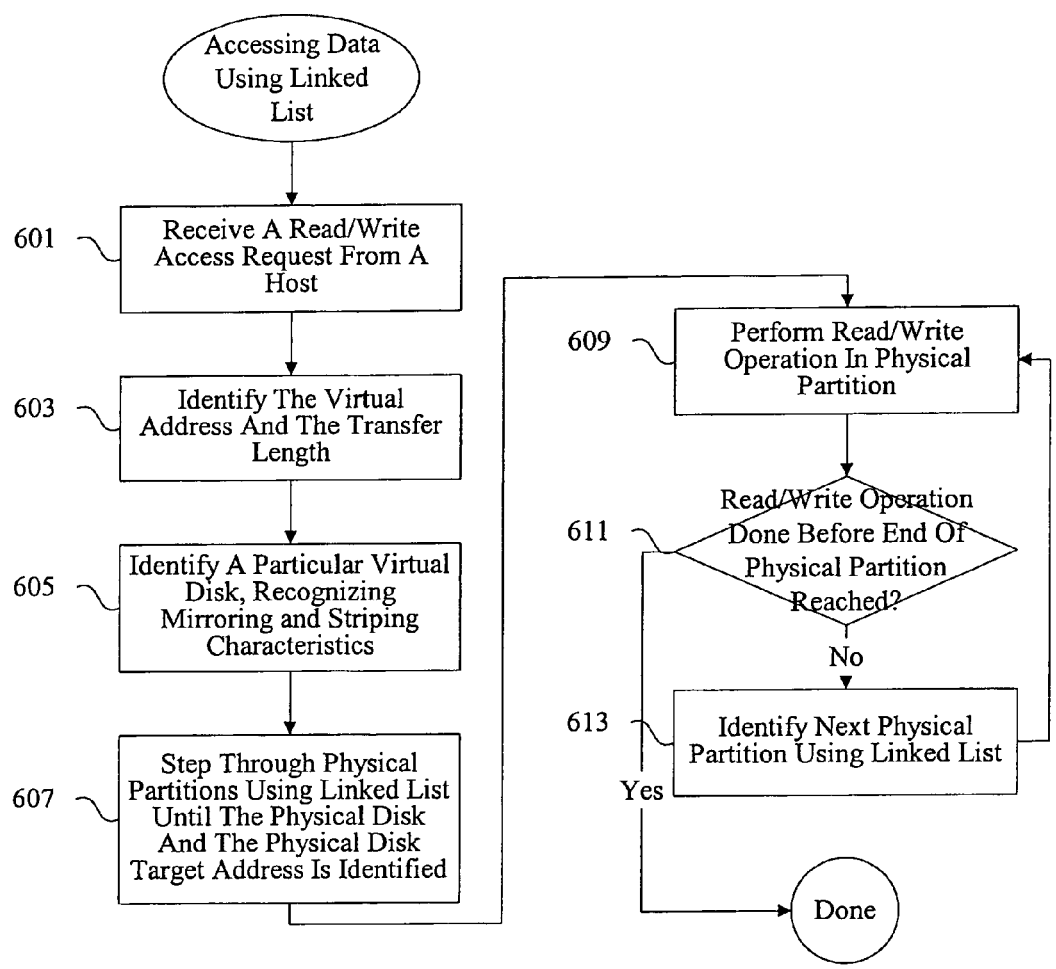
FIG. 6 is a process flow diagram showing disk access.

FIG. 6 is a flow process diagram showing one example of a disk access using a linked list. At 601, the fiber channel switch in a storage area network receives a read or write access request from a host. The read or write access request from the host includes a virtual disk address and the transfer length. At 603, the virtual disk address of the transfer length is identified. According to various embodiments, the virtual disk address is a virtual logical unit logical block address that is mapped to a plurality of virtual disks based on striping and mirroring needs. In one example, the virtual disk address is mapped on to two different virtual disks to allow for mirroring. At 605, the virtual disks relevant to the read or write operation are identified.

As noted above, each virtual disk typically includes multiple physical partitions. To determine the physical partition with the target address where the read or write operation should be performed, the different physical partitions are stepped through using the link list and until the physical disk and the physical disk target address are identified at 607. In one example, a first physical partition in the virtual disk is identified. The characteristics of the physical partition are analyzed to determine if the virtual address would fall within the first physical partition. If the virtual address for the read or write operation is 1 GB, and the first physical partition is configured to hold information from 0 GB to 4 GB, the first physical partition would be selected. However, if the virtual disk address for the read or write operation is 5 GB, the linked list is used to identify the second physical partition to determine if the read or write operation should be performed in the second physical partition. When the appropriate physical partition and the physical disk target address is identified, the read or write operation is performed in the selected physical partition at the target physical partition address.

At 611, it is determined if the read or write operation is done before the end of the physical partition is reached. If the read or write operation is done before the end of the physical partition is reached, the read or write operation is completed and a done signal is provided to the host for write operations and read data is provided to the host for read operations. However, if the read or write operation is not done before the end of the physical partition is reached, the next physical partition is identified using the link listed at 613 and the read or write operation is performed on the next physical partition.

It should be noted that determining if the read or write operation is done before reaching the end of the physical partition can be completed before or during the read or write operations. In one example, the determination of whether the read or write operation can complete in a given physical partition can be determined by examining the transfer length associated with the access request from the host and the available space from the physical partition target address to the physical partition end address. Furthermore, it should be noted that the techniques described for accessing the data using a linked list may be performed on multiple virtual disks substantially simultaneously. For example, if the data is being mirrored onto a second virtual disk, techniques described above may be performed while the techniques are performed on the first virtual disk.

Figure 7:
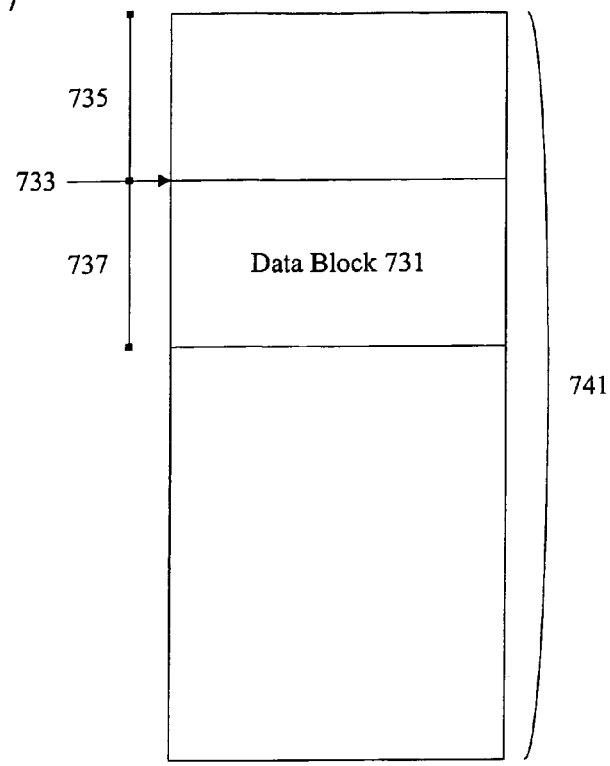
FIG. 7 is a diagrammatic representation showing a virtual address space associated with a virtual disk through an index.
Figure 7:
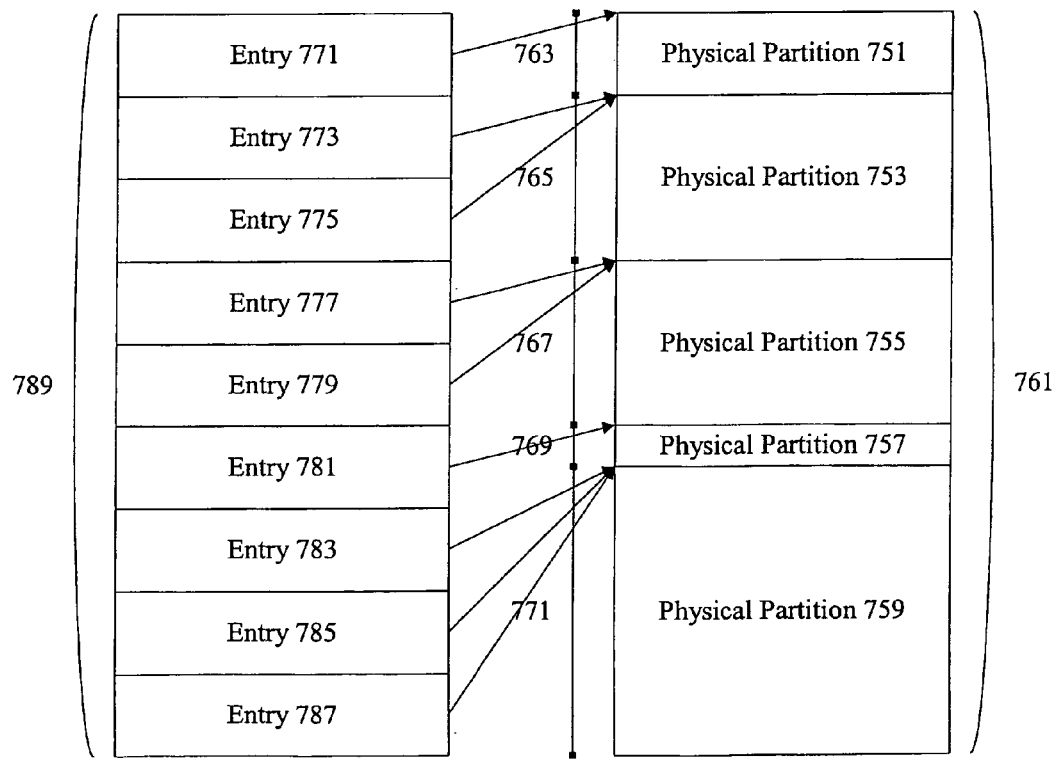

FIG. 7 is a diagrammatic representation showing one example of an index that can be used to implement the techniques of the present invention. According to various embodiments, the virtual address space 741 includes data block 731 with a length of 737 and a virtual disk address of 733. The virtual disk address offset from the start of the virtual disk is represented by length 735. Virtual disk 761 includes physical partitions 751, 753, 755, 757, and 759 with corresponding lengths of 763, 765, 767, 769, and 771. Index 789 includes multiple entries referencing the start addresses of the multiple physical partitions in the virtual disk 761. An index that includes multiple entries referencing multiple physical partitions in a virtual disk is referred to herein as a physical partitions index.

According to various embodiments, each entry in the index 789 is associated with a length of virtual disk address space equivalent to the size of the smallest physical partition in the virtual disk 761. However, to reduce memory requirements in the fiber channel switch, fewer entries can be included in the index 789. In one embodiment, entry 771 corresponds to addresses between 0 and 1 GB. Entry 773 corresponds to addresses between 1 GB and 2 GB, etc. A data block with a start address 1.5 GB from the start of the virtual address space would access entry 773 to determine where the read or write operation would occur. In one example, the virtual disk address 733 is divided or right shifted in order to determine which entry to access. For example, if the address is 0x800000 (4 GB), right shifting by 22 (1 GB) would yield and index position of 4, which points to 779, assuming a block size of 512 bytes. That is, 0x800000>>22=4.

According to various embodiments, using the physical partitions index allows direct access to a physical partition with minimal usage of the conventional linked list. The physical partitions index also allows access to a physical partition without comparing an excessive range of addresses. In one example, the data block is determined to have a start address corresponding to entry 785. The entry 785 points directly to physical partitions 759. Instead of having to step through the linked list from physical partition 751, to physical partition 753, to physical partition 755, to physical partition 757, and finally to physical partition 759, and comparing the virtual disk address to the address range in each physical partition, the physical partition 759 can be directly accessed. Performing direct access to physical partitions is particularly advantageous when using hardware to implement techniques of the present invention, since access by using right shifting operations are extremely efficient relative to comparison operations. Using a physical partitions index allows a target address in a physical partition to be determined using the following formula:

Physical partition target address=physical partition start address+(virtual disk address−physical partition offset in virtual disk) (Equation 1)

In an example where each entry in the physical partitions index corresponds to 1 GB and the virtual disk address where the data block should be written is 2.1 GB, the index entry 775 would be selected since the entry 775 corresponds to addresses between 2 and 3 GB. The physical partition offset in the virtual disk is equal to 1 GB since length 763 is 1 GB. The virtual disk address is 2.1 GB. The physical partition start address is the address where the partition starts in a target physical disk. In one example, the partition start address may be in the middle of a 100 GB target physical disk at 56 GB. In this example, the physical partition would extend from 56 GB to 58 GB.

Equation 1 would be used as follows:

Physical partition target address=56 GB+(2.1 GB−1 GB)=57.1 GB on the target physical disk The data would be read or written to the address corresponding to 57.1 GB on the target physical disk. According to various embodiments, the data would be read or written onto logical units associated with the 57.1 GB address.

In another example, each entry in the physical partitions index corresponds to 1 GB and the virtual disk address where the data block should be written is 5.75 GB, the index entry 781 would be selected since the entry is mapped to addresses between 5 GB and 6 GB. However, the physical partition 757 reference only includes addresses between 5 GB and 5.5 GB. Consequently, the linked list used in conventional implementations can be used to locate the next physical partition 759. The physical partition offset in the virtual disk would be equal to 5.5 GB since the sum of the lengths 763, 765, 767, and 769 is 5.5 GB. The virtual disk address is 5.75 GB. The physical partition start address is the address where the partition starts in a target physical disk. In this example, the partition start address is located at 350 GB on a 1 TB disk.

Equation 1 would be used as follows:

Physical partition target address=350 GB+(5.75 GB−5.5 GB)=350.25 GB on the target physical disk.

The data would be read or written to the address corresponding to 350.25 GB on the target physical disk. According to various embodiments, the data would be read or written onto logical units associated with the 350.25 GB address. However, because the entry 781 corresponds to addresses between 5 GB and 6 GB while the physical partition referenced corresponds only to addresses between 5 GB and 5.5 GB, the linked list is still accessed. To reduce the need to access the link list, each entry can be made to correspond to an address space equivalent to the smallest physical partition in the virtual disk. In this example, each entry would correspond to 500 MB, which is equivalent to the size of physical partition 757. However, increasing the number of entries also increases memory needs in the fiber channel switch.

Figure 8:
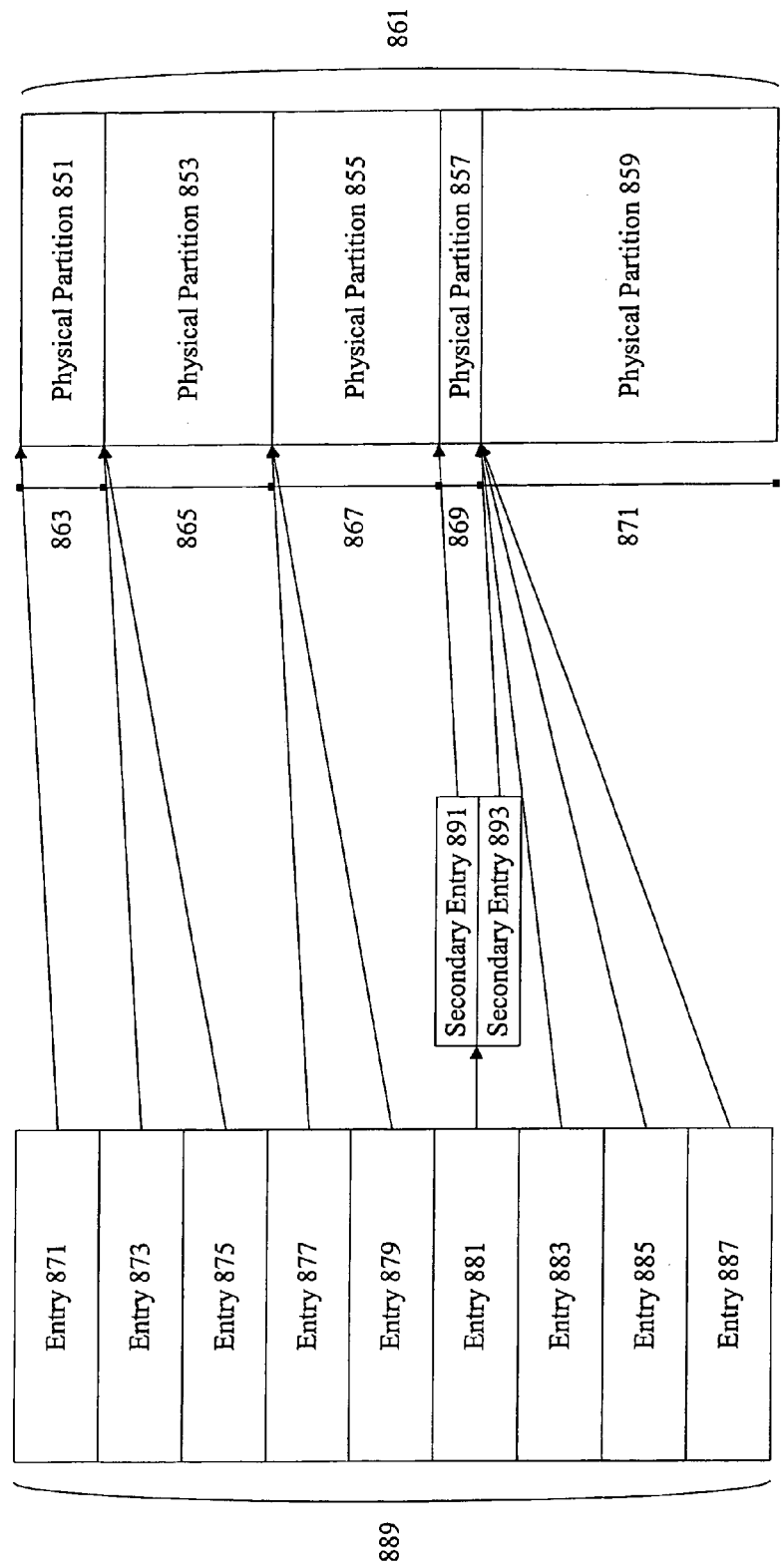
FIG. 8 is a diagrammatic representation showing multiple indices associating a virtual address space with a virtual disk.

FIG. 8 is a diagrammatic representation showing a secondary index or a secondary physical partitions index that can be used to reduce the need to access the linked list while also minimizing memory requirements. The index 889 includes multiple entries. In one example, the entries corresponding to 1 GB of address space. However, where the address space corresponding to a particular entry is greater then be size of the physical partition referenced, a secondary index is used. For example, entry 881 corresponds to addresses between 5 GB and 6 GB while the reference physical partition 857 corresponds only to addresses between 5 GB and 5.5 GB. Instead of referencing the physical partition 857, the entry 881 references a secondary index with secondary entries 891 and 893. If an address is determined to fall within entry 881, the address is that can check to determine whether it would fall under entry 891 or

893. If the virtual addresses between 5 GB and 5.5 GB, the secondary entry 891 would be used to reference physical partition 857. It should be noted that referencing a particular physical partition or secondary index can be done in a variety of manners. In one example, a reference is an entry including an address with the location of the secondary index. In another example, a reference is a pointer to a secondary index.

However if the address falls between 5.5 GB and 6 GB, secondary entry 893 would be used to reference physical partition 859. In this manner, a linked list would not have to be used to access physical partition 859 as addresses falling in the 5.5 GB to the 6 GB range would fall at a secondary entry 893. According to various embodiments, which entry in a secondary index a virtual address falls into is determined in the same manner used to select entries in the primary physical partitions index. In one embodiment, the virtual disk address is divided or right shifted to determine the particular entry. For example, a 5.25 GB virtual address would be divided by 1 GB to determine that the index entry is 5 corresponding to entry 881. When it is determined that the entry 881 references a secondary index, the 5.25 GB virtual address is again divided. Right shifting the virtual address would yield a similar result. For the secondary index, the 0.25 GB of the 5.25 GB is divided by 0.1 GB to yield 2.5. Results between 0 and 5 would fall under secondary entry 891 while results between 5 and 10 would fall under secondary entry 893. Here, the result of 2.5 would fall under secondary entry 891 and the physical partition 857 would be referenced.

Figure 9:
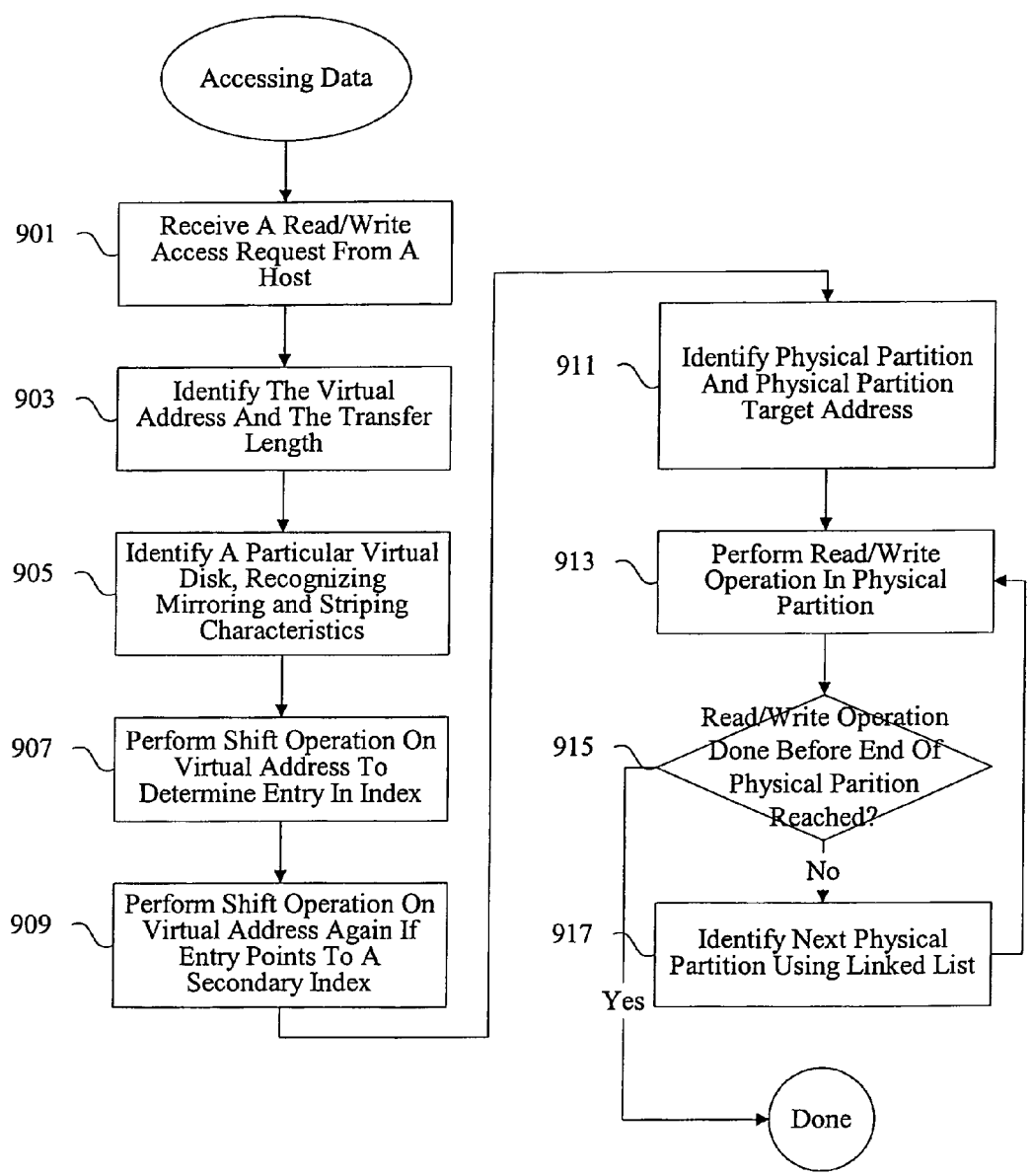
FIG. 9 is a process flow diagram showing disk access using a physical partitions index.

FIG. 9 is a flow process diagram showing one example of data access using a physical partitions index. At 901, the read or write access request is received from a host. At 903, the virtual address and the transfer length are identified. At 905, the particular virtual disk is identified by recognizing the mirroring and stripping characteristics. At 907, various shift operations or divide operations are performed on the virtual address to determine the particular entry in the index that corresponds to the virtual address. By performing shift operations or divide operations to quickly identify and entry in the index, multiple compare operations are not needed to locate a physical partition using a linked list. In typical implementations, the virtual address is compared with address ranges associated with the various physical partitions. If the virtual address does not fall in the address range of a first physical partition, the next physical partition is identified and the virtual address is compared with the address range in the second physical partition. However, stepping through the various physical partitions is inefficient. By including an index with entries that can be efficiently accessed by performing divide or shift operations on a virtual address, disk access efficiency is improved.

If the physical partition index entry points to a secondary index, another shift operation or divide operation is used to determine the appropriate entry in the secondary index. It should be noted that additional indexes can also be used. At 911, the physical partition in the physical partition target address are identified by using the physical partitions index as well as any secondary index or tertiary index. It should be noted that any level of index tables are possible for efficient lookups. The physical partition target address can be determined using Equation 1 as noted above. At 913, read or write operations are performed at the physical partition target address.

At 915, it is determined if the read or write operation is done before the end of the physical partition is reached. If the read or write operation is done before the end of the physical partition is reached, the read or write operation is completed and a done signal possibly with read data is provided to the host. However, if the read or write operation is not done before the end of the physical partition is reached, the next physical partition is identified using the linked list at 917, and the read or write operation is performed on the next physical partition.

As described above, disk access using a virtual address may be performed in a variety of network devices or switches. According to various embodiments, a switch includes a processor, network interfaces, and memory for maintaining physical partition indices. A variety of ports, Media Access Control (MAC) blocks, and buffers can also be provided as will be appreciated by one of skill in the art.

Figure 10:
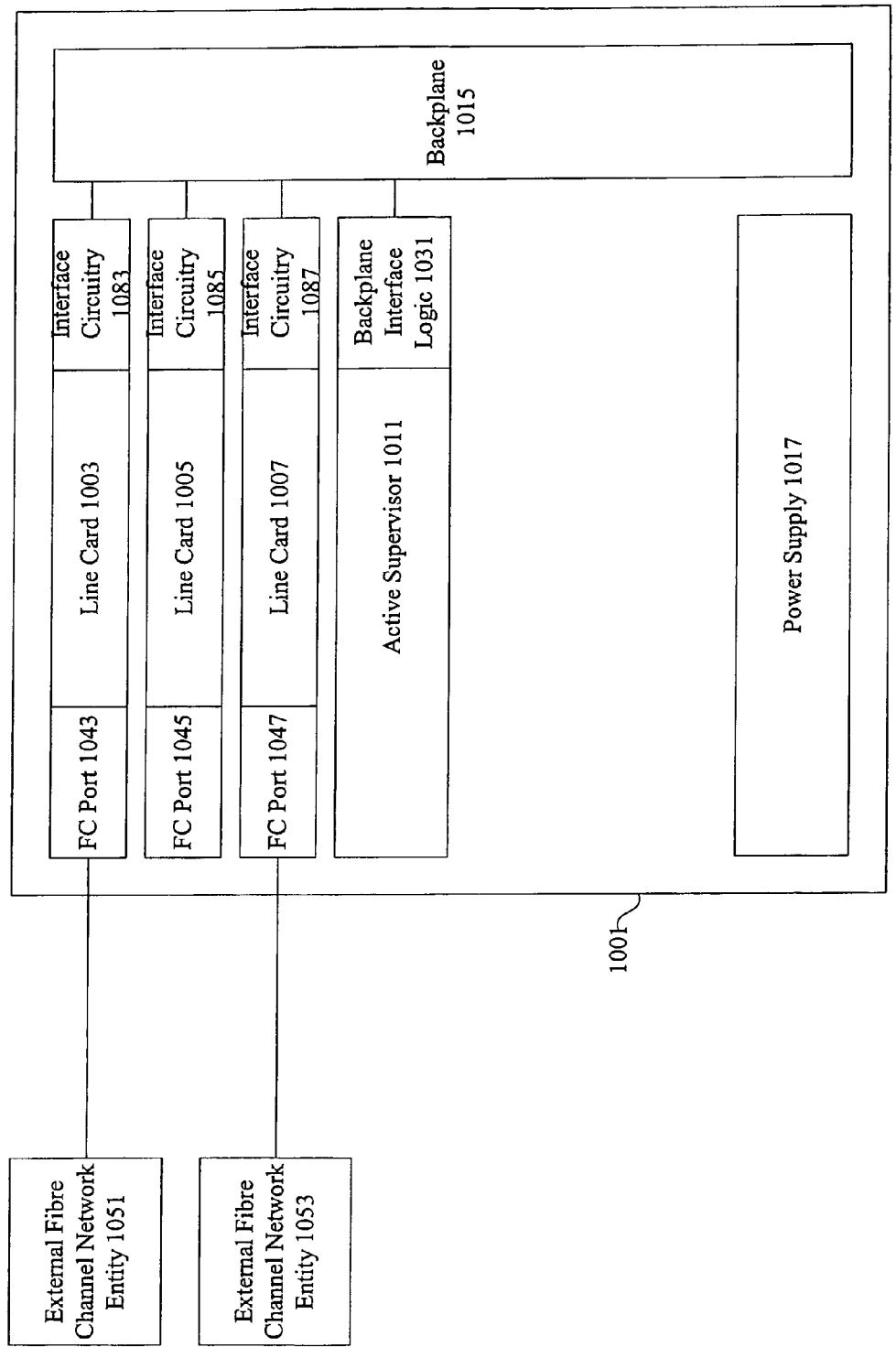
FIG. 10 is a diagrammatic representation of a fibre channel switch.

FIG. 10 is a diagrammatic representation of one example of a fibre channel switch that can be used to implement techniques of the present invention. Although one particular configuration will be described, it should be noted that a wide variety of switch and router configurations are available. The fibre channel switch 1001 may include one or more supervisors 1011. According to various embodiments, the supervisor 1011 has its own processor, memory, and storage resources.

Line cards 1003, 1005, and 1007 can communicate with an active supervisor 1011 through interface circuitry 1083, 1085, and 1087 and the backplane 1015. According to various embodiments, each line card includes a plurality of ports that can act as either input ports or output ports for communication with external fibre channel network entities 1051 and 1053. The backplane 1015 can provide a communications channel for all traffic between line cards and supervisors. Individual line cards 1003 and 1007 can also be coupled to external fibre channel network entities 1051 and 1053 through fibre channel ports 1043 and 1047.

External fibre channel network entities 1051 and 1053 can be nodes such as other fibre channel switches, disks, tape libraries, or servers. It should be noted that the switch can support any number of line cards and supervisors. In the embodiment shown, only a single supervisor is connected to the backplane 1015 and the single supervisor communicates with many different line cards. The active supervisor 1011 may be configured or designed to run a plurality of applications such as routing, domain manager, system manager, and utility applications.

According to one embodiment, applications are configured to maintain virtual disks, identify virtual disks associated with particular hosts based on mirroring and striping characteristics, build physical partition indices and maintain linked lists associated with the various physical partitions. A utility application can be configured to track the read and write operations. A domain manager application can be used to assign domains in the fibre channel storage area network. Various supervisor applications may also be configured to provide functionality such as mirroring, striping, and concatenation implementation, virtual disk configuration, and physical partitions index management.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Although the techniques of the present invention in the context of disk access, it should be noted that a variety of disk alternatives are contemplated. The techniques of the present invention are applicable to access of any persistent storage device. Any mechanism that maintains information whether a host is active or inactive is referred to herein as a persistent storage device. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A method for accessing data, the method comprising:
    receiving a disk access request at a fibre channel switch from a host, the disk access request identifying a fibre channel transfer length and a fibre channel virtual disk address in a virtual disk address space associated with the host; and
    identifying an entry in an index, the entry corresponding to the virtual disk address in the virtual disk address space, wherein the entry provides access to a physical partition by referencing a secondary physical partition index.

2. The method of claim 1, wherein the index is a physical partition index.

3. The method of claim 1, wherein the entry references the physical partition.

4. The method of claim 1, wherein the entry includes a pointer referencing the start address of the physical partition.

5. The method of claim 1, wherein referencing the secondary physical partition index comprises using one or more pointers.

6. The method of claim 5, further comprising identifying a secondary entry in the secondary physical partition index.

7. The method of claim 6, wherein the secondary entry references the physical partition.

8. The method of claim 7, wherein the entry includes a pointer referencing the start address of the physical partition.

9. The method of claim 1, wherein the physical partition is one of a plurality of physical partitions in a virtual disk.

10. The method of claim 1, wherein a plurality of partitions are concatenated using a linked list to form a virtual disk.

11. The method of claim 1, wherein a plurality of virtual disks are associated with the host.

12. The method of claim 1, wherein the disk access request is transmitted to a plurality of virtual disks.

13. The method of claim 1, wherein the entry is identified by dividing the virtual disk address space by the physical partition index block size.

14. The method of claim 1, wherein the entry is associated with a virtual disk offset.

15. The method of claim 1, further comprising determining a physical partition target address by adding the physical partition start address to the difference between the virtual disk offset and the virtual disk address.

16. The method of claim 1, further comprising determining if the transfer length is greater than the difference between the physical partition end address and the physical partition target address.

17. The method of claim 1, wherein if the transfer length is greater than the difference between the physical partition end address and the physical partition target address, accessing a subsequent physical partition using the linked list.

18. A fibre channel switch, comprising:
    an interface configured to receive a disk access request at a fibre channel switch from a host, the disk access request identifying a fibre channel transfer length and a fibre channel virtual disk address in a virtual disk address space associated with the host; and
    a processor coupled to the interface, the processor configured to identify an entry in an index, the entry corresponding to the virtual disk address in the virtual disk address space, wherein the entry provides access to a physical partition by referencing a secondary physical partition index.

19. The fibre channel switch of claim 18, wherein the index is a physical partition index.

20. The fibre channel switch of claim 18, wherein the entry references the physical partition.

21. The fibre channel switch of claim 18, wherein the entry includes a pointer referencing the start address of the physical partition.

22. The fibre channel switch of claim 18, wherein the entry references the secondary physical partition index by using one or more pointers.

23. The fibre channel switch of claim 22, further comprising identifying a secondary entry in the secondary physical partition index.

24. The fibre channel switch of claim 23, wherein the secondary entry references the physical partition.

25. The fibre channel switch of claim 24, wherein the entry includes a pointer referencing the start address of the physical partition.

26. The fibre channel switch of claim 18, wherein the physical partition is one of a plurality of physical partitions in a virtual disk.

27. The fibre channel switch of claim 18, wherein the plurality of partitions are concatenated using a linked list to form a virtual disk.

28. A method for accessing data, the method comprising:
    receiving a persistent storage access request at a fibre channel switch from a host, the persistent storage access request identifying a fibre channel transfer length and a fibre channel virtual address in a virtual persistent storage address space associated with the host; and
    identifying an entry in a physical partition index, the physical partition index associated with a plurality of physical partitions and a secondary physical partition index, the entry corresponding to the virtual address in the virtual persistent storage address space, wherein the entry references a target physical partition having a first size by using the secondary physical partition index.

29. The method of claim 28, further comprising:
    determining a target physical address in the target physical partition.

30. A fibre channel switch, comprising:
    means for receiving a disk access request at a fibre channel switch from a host, the disk access request identifying a fibre channel transfer length and a fibre channel virtual disk address in a virtual disk address space associated with the host; and means for identifying an entry in an index, the entry corresponding to the virtual disk address in the virtual disk address space, wherein the entry provides access to a physical partition by using a secondary physical partition index.

31. The fibre channel switch of claim 30, wherein the index is a physical partition index.

32. The fibre channel switch of claim 30, wherein the entry references the physical partition.

33. The fibre channel switch of claim 30, wherein the entry includes a pointer referencing the start address of the physical partition.

* * * * *